(12) United States Patent
Pechinko et al.

(10) Patent No.: US 11,182,999 B2
(45) Date of Patent: Nov. 23, 2021

(54) AUTOMATED MACHINE PROVIDED WITH A BILL ACCEPTOR FOR DRIVING A DRIVE DEVICE

(71) Applicant: Japan Cash Machine Co., Ltd., Osaka (JP)

(72) Inventors: Paul Pechinko, Geneva, OH (US); Takayuki Takeda, Osaka (JP); Yasumasa Suzuki, Osaka (JP); Koji Kuroiwa, Osaka (JP)

(73) Assignee: Japan Cash Machine Co., Ltd.

( * ) Notice: Subject to any disclaimer, the term of this patent is extended or adjusted under 35 U.S.C. 154(b) by 0 days.

(21) Appl. No.: 16/785,850

(22) Filed: Feb. 10, 2020

(65) Prior Publication Data

US 2020/0175800 A1 Jun. 4, 2020

Related U.S. Application Data

(63) Continuation-in-part of application No. 15/442,988, filed on Feb. 27, 2017, now Pat. No. 10,559,155, (Continued)

(30) Foreign Application Priority Data

Oct. 4, 2011 (JP) ................. 2011-220456

(51) Int. Cl.
*G07D 7/00* (2016.01)
*G06Q 20/32* (2012.01)
*G07D 11/12* (2019.01)

(52) U.S. Cl.
CPC ........... *G07D 7/00* (2013.01); *G06Q 20/3223* (2013.01); *G07D 11/12* (2019.01); *G07D 2207/00* (2013.01)

(58) Field of Classification Search
CPC ....... G07D 7/00; G07D 11/12; G06Q 20/3223
(Continued)

(56) References Cited

U.S. PATENT DOCUMENTS 5,709,293 A 1/1998 Ishida et al.
5,975,274 A 11/1999 Novak et al.
(Continued)

FOREIGN PATENT DOCUMENTS

EP 1160744 A2 12/2001
EP 1510978 A1 3/2005
(Continued)

OTHER PUBLICATIONS

Supplementary European Search Report for Application No. EP 12838169.6 dated Apr. 24, 2015.
(Continued)

*Primary Examiner* — Olabode Akintola
*Assistant Examiner* — Liz P Nguyen
(74) *Attorney, Agent, or Firm* — FisherBroyles, LLP; Rob L. Phillips (57) ABSTRACT

An automated machine 1 is provided to comprise a communications device 5 for receiving remotely operable signals emitted from a mobile terminal 10 to produce monetary signals corresponding to money amount data in the remotely operable signals, a bill acceptor 4 for validating bills inserted from the outside to produce the monetary signals when bill acceptor 4 judges the inserted bill to be genuine and for relaying the monetary signals from communications device 5, a control device 8 that has built-in program software to produce drive signals of the amount corresponding to the monetary signals in accordance with the program software when control device 8 receives the monetary signals from bill acceptor 4. In another aspect, communications device 5 may receive the remotely operable signals emitted from
(Continued)

mobile terminal 10 to produce the monetary signals corresponding to the money amount data in the remotely operable signals and receive the monetary signals from bill acceptor 4 and send them to control device 8.

4 Claims, 9 Drawing Sheets

Related U.S. Application Data which is a continuation-in-part of application No. 13/644,352, filed on Oct. 4, 2012, now Pat. No. 9,582,957.

(58) Field of Classification Search
USPC .......................................................... 705/44
See application file for complete search history.

(56) References Cited

U.S. PATENT DOCUMENTS

| | | | |
|---|---|---|---|
| 6,264,556 B1 | 7/2001 | Izawa et al. | |
| 2002/0161703 A1 | 10/2002 | Okamoto et al. | |
| 2002/0188575 A1 | 12/2002 | Freeny, Jr. | |
| 2004/0149537 A1* | 8/2004 | Pai | G07D 7/00 194/203 |
| 2004/0238319 A1 | 12/2004 | Hand et al. | |
| 2006/0054687 A1 | 3/2006 | Betti et al. | |
| 2007/0099696 A1 | 5/2007 | Nguyen et al. | |
| 2008/0045314 A1* | 2/2008 | Okada | G07F 17/3267 463/20 |
| 2008/0048973 A1 | 2/2008 | McKay | |
| 2009/0210258 A1 | 8/2009 | Cardot et al. | |
| 2009/0221366 A1* | 9/2009 | Ward | G07F 17/323 463/30 |
| 2009/0307491 A1 | 10/2009 | Nakatsugawa et al. | |
| 2010/0174650 A1 | 7/2010 | Nonaka | |
| 2011/0238573 A1 | 9/2011 | Varadarajan | |
| 2011/0258090 A1* | 10/2011 | Bosch | G06Q 40/02 705/30 |
| 2012/0047068 A1 | 2/2012 | Kanisawa et al. | |
| 2012/0322542 A1* | 12/2012 | Chudd | G07F 17/3216 463/25 |

FOREIGN PATENT DOCUMENTS

| | | |
|---|---|---|
| JP | 8280913 A | 10/1996 |
| JP | 09138851 A | 5/1997 |
| JP | 11253609 A | 9/1999 |
| JP | 2002000922 A | 1/2002 |
| JP | 2002078953 A | 3/2002 |
| JP | 2003316959 A | 11/2003 |
| JP | 2005100429 A | 4/2005 |
| JP | 2006127390 A | 5/2006 |
| JP | 2007151706 A | 6/2007 |
| JP | 2008257518 A | 10/2008 |
| JP | 2009265991 A | 11/2009 |
| JP | 2010262389 A | 11/2010 |
| TW | 201012164 A | 3/2010 |

OTHER PUBLICATIONS

Japanese Official Action for Application No. 2012-221694, dated Apr. 22, 2014.
Japanese Official Action for Application No. 2014-128453 dated Jun. 23, 2015.
International Search Report for PCT/JP2012/006355 dated Nov. 13, 2012.
Taiwanese Official Action for Application No. 101136669 dated Feb. 10, 2015.
U.S. Office action for U.S. Appl. No. 13/644,452 dated Jun. 11, 2013.
U.S. Office action for U.S. Appl. No. 13/644,452 dated Oct. 7, 2014.
U.S. Office action for U.S. Appl. No. 13/644,452 dated May 12, 2015.
European Office action dated Jun. 13, 2019 issued for European Patent Application No. 12838169.5.
European Office action (preliminary rejection) dated Jul. 18, 2019 issued for European Patent Application No. 12838169.5.

\* cited by examiner

AUTOMATED MACHINE PROVIDED WITH A BILL ACCEPTOR FOR DRIVING A DRIVE DEVICE

CROSS-REFERENCE TO RELATED APPLICATIONS

This case is the U.S. Continuation In-Part Application of U.S. application Ser. No. 15/442,988 filed Feb. 27, 2017 which is the U.S. Continuation In-Part application of Ser. No. 13/644,352 filed Oct. 4, 2012 that is now matured into U.S. Pat. No. 9,582,957 which claims the convention priority of Japanese Patent Application No. 2011-220456 filed Oct. 4, 2011.

TECHNICAL FIELD

This invention relates to an automated machine that comprises a communications device for receiving remotely operable signals emitted from a mobile terminal such as a cell phone and a bill acceptor for accepting bills inserted from the outside and for receiving monetary signals from the communications device.

BACKGROUND OF THE INVENTION

In countries such as the U.S. that authorize casino-owning business, players can enjoy games with gaming machines while paying cash for games in casinos or game halls. Some of known gaming machines usually have bill acceptors for example as shown in U.S. Pat. No. 6,264,556 (Document 1). In another aspect, Japanese Patent Disclosure No. 2009-265991 (Document 2) demonstrates an electronic settlement system in game halls such as amusement arcades.

A gaming machine shown in Document 1 comprises a button panel including a display and a user interface area for allowing an operator to play a game of chance, a bill acceptor incorporated into the machine for accepting and validating currency to credit the user with a corresponding number of play credits for the gaming apparatus, and a note dispenser for dispensing currency as payout for successful play.

An electronic settlement system exhibited in Document 2 comprises a plurality of terminal systems each electrically connected to corresponding one of a plurality of gaming machines provided in amusement arcades to handle transaction fee information in terminal systems, and a payment device communicated with the terminal systems through a communication network to electronically pay playing fees in gaming machines from terminal systems. Each terminal system comprises a card processor for rewriting squared information stored in an IC (integrated circuit) card for settlement and a settlement controller for establishing a telecommunication with the payment device to send and receive squared information between the card processor and settlement controller in accordance with command signals from the electronic settlement device and to give a gaming machine a permission of the utilization when receiving a notice of settlement completion from the payment device. The payment device comprises a signal processor for making settlement based on squared information read from IC card through a terminal system and for writing new squared information on the IC card through the terminal system upon completion of payment process, a settlement communicator for sending a settlement signal of the payment to the terminal system, and a processing communicator for sending processed information on settlement process to a superior settlement system through a communication route except the communication network.

Meanwhile, a known debit card is a plastic card that allows electronic access of the cardholder to his or her bank account at a financial institution. Some cards have a stored value for payment by withdrawing funds from a designated account in favor of the designated payee's bank account. The card can be used as an alternative payment method to cash when making purchases. In some cases, the primary account number is assigned for use on the Internet. Unlike credit and charge cards, a debit card makes it possible to make an immediate payment to a payee from the cardholder's designated bank account. Debit cards usually also allow for instant withdrawal of cash, acting as the ATM card for withdrawing cash.

However, there would be needs for an automated machine that comprises a communications device for receiving remotely operable signals emitted from a mobile terminal and a bill acceptor that validates bills and alternatively receives monetary signals from the communications device to automatically provide users with goods, services or amusements by selective electronic or bill payment for the real-time no credit transaction.

An object of the present invention is to provide an automated machine that comprises a communications device for receiving remotely operable signals emitted from a mobile terminal and a bill acceptor for validating bills and for receiving monetary signals from the communications device for the real-time no credit electronic transaction to offer goods, services or amusement to users from automated machine. Another object of the present invention is to provide an automated machine that has an option for a user to operate the automated machine by cashless electronic payment through remotely operable signals from a mobile terminal or by cash payment through a bill acceptor.

SUMMARY OF THE INVENTION

The automated machine (1) according to the present invention comprise a communications device (5) for receiving remotely operable signals emitted from a mobile terminal (10) to produce monetary signals corresponding to money amount data in the remotely operable signals, a bill acceptor (4) for validating bills inserted from the outside to produce the monetary signals when bill acceptor (4) decides the inserted bill to be genuine and for relaying the monetary signals from communications device (5), a control device (8) that has built-in program software to produce drive signals of the amount corresponding to the monetary signals in accordance with the program software when the control device (8) receives the monetary signals from the bill acceptor (4), and a drive device (3) driven by the drive signals from control device (8). In another embodiment, communications device (5) may receive the remotely operable signals emitted from mobile terminal (10) to produce the monetary signals corresponding to the money amount data in the remotely operable signals and alternatively receive the monetary signals from bill acceptor (4) to send both of the monetary signals to control device (8).

Communications device (5) retrieves from remotely operable signals account number signals identifying a holder of the account at the financial database (7) and retrieves or receives monetary signals indicative of a transaction fee necessary to drive automated machine (1) simultaneously with, before or after receiving remotely operable signals. Automatic payment device (6) receives from communications device (5) the holder's account number signals and the amount of the transaction fee, and withdraws the amount of the transaction fee from the holder's account at financial database (7) of the banking depository system. Then, automatic payment device (6) deposits the withdrawn transaction fee into another account of the interested person at the financial database (7) concerned with automated machine (1) and produces an authorization signal to communications device (5) that then produces the monetary signals indicative of the transaction fee to drive automated machine (1) for completion of prompt electronic transaction. In another embodiment, automatic payment device (6) produces the authorization signal to bill acceptor (4) that then produces the monetary signals indicative of the transaction fee to drive automated machine (1) for completion of prompt electronic transaction. In this embodiment, printer (51) may print on the recording medium the monetary signals indicative of the transaction fee received from communications device (5) and issue the recording medium to accomplish the real-time no credit electronic transaction to offer goods, services or amusement to users from automated machine (1). Simultaneously, users can see the dispensed recording medium to confirm the amount of the transaction fee that was withdrawn from the holder's account at the financial database (7).

In another aspect, the electronic payment system may comprise: a mobile terminal (10) for emitting remotely operable signals, a printing machine (11) arranged off from mobile terminal (10), and an automated machine (1) driven by monetary signals from printing machine (11). Mobile terminal (10) comprises: a memory device (34) for storing an electronic amount signal of prepaid money and at least one of specific PIN and ID number signals for identifying a holder of the mobile terminal (10), a transmission device (32) for emitting the remotely operable signals including at least the electronic amount signal and the specific signal, and a reception device (33) for receiving a deduction signal emitted from printing machine (11). Printing machine (11) comprises: a communications device (5) for receiving the remotely operable signals emitted from mobile terminal (10), a storage device (13) for storing at least one of users' PIN and ID number signals, and a recording device (51) connected to communications device (5) for printing information on a record radium.

Communication device (5) continuously does performances (i) to (vii) made up of executions: (i) receiving the remotely operable signals from the movable terminal (10), (ii) retrieving the electronic amount signal and the at least one of the specific signals in the remotely operable signals, (iii) also receiving monetary signals indicative of a transaction fee necessary to drive the automated machine (1) simultaneously with, before or after receiving the remotely operable signals, the monetary signals being either contained in the received remotely operable signals or transmitted from an entry device (25) provided in the automated machine (1), (iv) comparing the at least one of the specific signals with the at least one of users' specific PIN and ID number signals stored in the storage device (13), (v) producing monetary signals when the communications device (5) considers the monetary signals and the at least one of the specific signals to be effective as a result of the comparison to drives the automated device (1) by the monetary signals, (vi) depositing the withdrawn transaction fee into an interested person's account concerned with the automated machine (1), and (vii) forwarding the deduction signal to reception device (33) of mobile terminal (10). Reception device (33) in the mobile terminal (10) receives the deduction signal from communications device (5) to deduct the transaction fee from the prepaid money amount in memory device (34). Printer (51) prints on the recording medium the monetary signals indicative of the transaction fee received from communications device (5) and issues the recording medium.

BRIEF DESCRIPTION OF THE DRAWINGS

The above-mentioned and other objects and advantages of the present invention will be apparent from the following description in connection with the accompanying drawings showing preferred embodiments of the automated machine of the invention wherein.

BEST MODE FOR CARRYING OUT THE INVENTION

Figure 1:
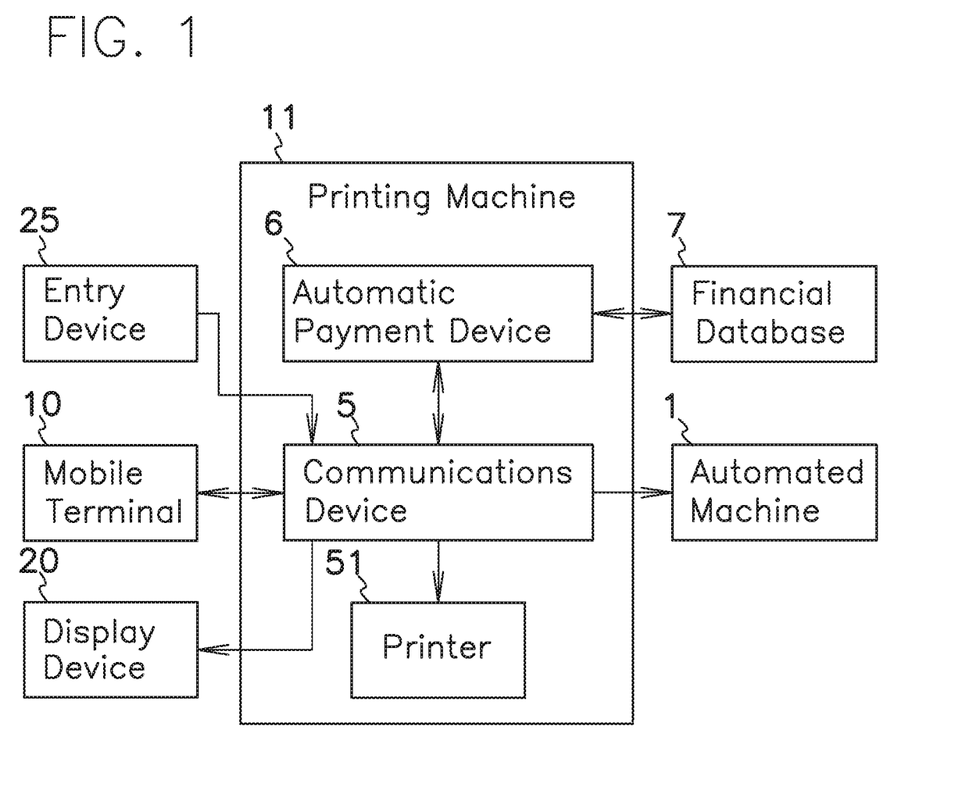
FIG. 1 is a schematic diagram showing a basic concept of the electronic payment system that incorporates the invention's automated machine.

FIG. 1 is a block diagram showing the basic concept of the electronic payment system of a bank account withdrawal payment type that comprises a mobile terminal 10 for emitting remotely operable signals, a printing machine 11 arranged off from mobile terminal 10, a financial database 7 of a banking depository system, and an automated machine 1 driven by printing machine 11. Printing machine 11 comprises a communications device 5 for receiving the remotely operable signals emitted from mobile terminal 10 to drive automated machine 1, an automatic payment device 6 connected to communications device 5 and financial database 7, and a printer 51 connected to communications device 5 for printing on a record radium information on automated machine 1 to inform users of.

Figure 2:
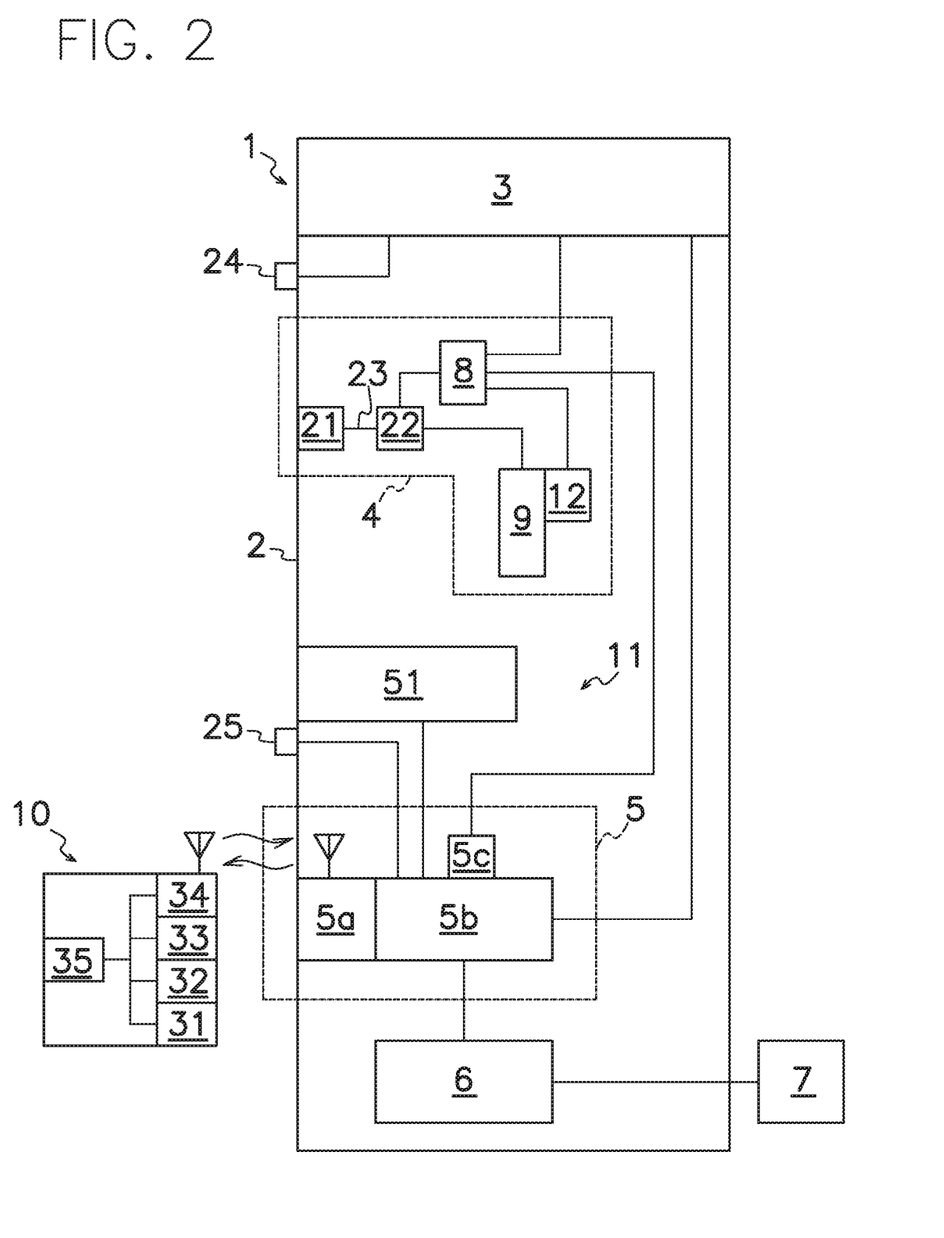
FIG. 2 is a schematic diagram showing a first embodiment of the invention's automated machine of the bank account withdrawal payment type applied to a gaming machine.

Communications device 5 shown in FIGS. 1 and 2 continuously does performances (i) to (iv) made up of executions: (i) receiving the remotely operable signals from mobile terminal 10, (ii) retrieving from the remotely operable signals, account number signals identifying a holder of the account at financial database 7 and monetary signals indicative of a transaction fee necessary to drive automated machine 1, (iii) forwarding the account number signals and monetary signals to automatic payment device 6 that then makes automatic electronic settlement and produces an authorization signal to communications device 5. At this time, as a further execution (iv), communications device 5 produces the monetary signals indicative of the transaction fee to drive automated machine 1 for completion of prompt electronic transaction. Automated machine 1 adoptable in the present invention may include at least one or a plurality of devices driven by drive device 3 such as cash dispensers, automated teller machines, vending machines, money exchangers, ticket machines, gaming machines or other type of money-operated machines, equipment and apparatus. Embodiments of the present invention herein adopt gaming machines as an example of automated machines, however, it would be apparent to those skilled in the art that they can similarly apply the invention to other driven machines or money-operated apparatus in a similar manner to these explanations.

Mobile terminal 10 emits or transmits remotely operable signals that includes information on a specific or unique account number or debit card number of financial database 7 identifying a holder of the account. Mobile terminal 10 radiates the remotely operable signals such as a radio or wireless signal or an optical beam signal of infrared, ultraviolet or visible ray, etc. to receive remotely operable signals by communications device 5. The remotely operable signals may be transmitted from mobile terminal 10 toward communications device 5 in various signal transmission configurations such as series and parallel data transmission, QR and bar coded data transmission or their combination, and these transmitted signals may be indicated on a display screen of mobile terminal 10. Mobile terminal 10 and communications device 5 are electrically connected to each other through wired or wireless mutual communication means for radio or optical connection. Mobile terminal 10 also may include a cellular phone, a smart phone utilizing wireless application protocol (WAP), personal digital assistant (PDA), portable computer, or a hand held computer for electronic payment through the debit or prepaid card transaction system. Debit card transaction systems may include J-Debit, VISADebit and Debit Master. Prepaid card transaction systems may include Eddy, Suica, PASMO, nanaco, and WAON. The aforementioned systems and devices are exemplary and mobile terminal 10 may comprise ones for other electronic payment systems or devices. Also, mobile terminal 10 may be an electronic computer terminal or an IC card that incorporates a built-in non-contact IC chip such as for example FeliCa (Registered Mark), MIFARE (Registered Mark) or NFC (Near Field Communication) chips.

Communications device 5 and automatic payment device 6 are electrically linked to each other through wired, wireless or intranet connection, Internet or combination thereof. Payment device 6 and financial database 7 such as banking depository systems are linked to each other through wired, wireless, intranet connection, Internet or combination thereof. In embodiments of the present invention, communications device 5 may be disposed within, outside of or adjacent to gaming machine 3 so far as users may operate mobile terminal 10 to get access to communications device 5 in the vicinity of or at a location not too far away from gaming machine 3. Both communications device 5 and payment device 6 may be disposed within or outside of a casing 2 of gaming machine 3 for any spatial reason, so far as users may easily get access gaming machine 3 and operate communications device 5. For a similar reason, one of communications device 5 and payment device 6 may be disposed within or outside of casing 2 so far as they may be electrically linked each other.

In this invention, the remotely operable signals emitted from mobile terminal 10 to communications device 5 certainly contains account number signals identifying a holder of the account at financial database 7 of a banking depository system. In contrast to this, there are two channels for sending monetary signals indicative of a transaction fee necessary to drive automated machine 1, and one route for the monetary signals is to convey it together with the remotely operable signals from mobile terminal 10 to communications device 5, and another route is to forward it from entry device 25 to communications device 5 independently from the remotely operable signals. In this way, communications device 5 always receives the account number signals identifying a holder of the account at financial database 7 of banking depository system and the monetary signals indicative of a transaction fee necessary to drive automated machine 1 when these signals are sent to communications device 5 through the same channel from mobile terminal 10 or through the different channels from mobile terminal 10 and entry device 25. A holder of the financial account usually is a same person that owns the mobile terminal, however, may be a different person from the owner of the mobile terminal.

When the remotely operable signals contain both of the account number signals and the monetary signals, communications device 5 simultaneously receives and retrieves these signals from the remotely operable signals. When communications device 5 receives the remotely operable signals containing the only account number signals, it retrieves the account number signals, and at this time, communications device 5 can receive the monetary signals from entry device 25 before or after receiving remotely operable signals. It follows that communications device 5 receives the monetary signals simultaneously with, before or after receiving remotely operable signals.

Automatic payment device 6 shown in FIGS. 1 and 2, continuously does the performances (i) to (iv) made up of executions: (i) receives the holder's account number signals and the amount of the transaction fee received from communications device 5, (ii) gets access to financial database 7 and withdraws the amount of the transaction fee from the holder's account at financial database 7 of the banking depository system, (iii) deposits the withdrawn transaction fee into an interested person's account at the financial database 7 concerned with automated machine 1 and (iv) after completion of prompt electronic transaction, produces an authorization signal to communications device 5 that then produces the monetary signals indicative of the transaction fee to drive automated machine 1. A vending machine for automated machine 1 dispenses an article or articles commensurate to or worth the transaction fee. In another embodiment, automatic payment device 6 (iii) deposits the withdrawn transaction fee into an interested person's account at the financial database 7 concerned with automated machine 1 and (iv) after completion of prompt electronic transaction, produces an authorization signal to a bill acceptor 4 that then produces the monetary signals indicative of the transaction fee to drive automated machine 1.

Printer 51 of printing machine 11 prints on the recording medium the monetary signals indicative of the transaction fee received from communications device 5 and issues the recording medium. Thus, the present invention may accomplish the real-time no credit electronic transaction to offer goods, services or amusement to users from automated machine 1. Simultaneously, users can see the dispensed recording medium to confirm the amount of the transaction fee that was withdrawn from the holder's account at financial database 7.

In a second embodiment of the invention shown in FIG. 2 applied to a gaming machine 3 as a driven device of an automated machine 1, same reference symbols are applied to same or similar elements shown in FIG. 1, omitting their description. Gaming machine 3 in FIG. 2 is disposed in a single casing 2 that also accommodates printing machine 11 and bill acceptor 4 to drive gaming machine 3 with monetary signals from communications device 5 or bill acceptor 4. Communications device 5 comprises a communications interface 5a for receiving the remotely operable signals from mobile terminal 10 and a signal processor 5b for receiving the remotely operable signals from communications interface 5a to retrieve from remotely operable signals and produce account number signals that identify a holder of the account at financial database 7 and if necessary holder's PIN and/or ID numbers and monetary signals to forward them to automatic payment device 6.

Bill acceptor 4 comprises an inlet sensor 21 for producing a detection signal when a bill is inserted into bill acceptor 4, a bill sensor 22 for producing a characteristic signal inclusive of an optical or magnetic signal when a bill is moved along bill sensor 22, a conveyor (not shown) for transporting a bill along a passageway 23 in bill acceptor 4 and a control device 8 for receiving detection signal from inlet sensor 21 and characteristic signal from bill sensor 22 to produce drive signals to conveyor when control device 8 considers the bill genuine. Specifically, control device 8 may verify whether or not the bill is genuine and what kind of denomination the bill has, and when it decides that the bill is genuine, control device 8 generates a denomination signal of the bill as monetary signals to gaming machine 3. Receiving each of monetary signals from control device 8, gaming machine 3 is driven with drive signals commensurate or corresponding to the amount of received monetary signals. Printer 51 connected to communications device 5 prints on a recording medium gaming information, data on refund amount and administration codes to issue the recording medium as a coupon.

On the other hand, control device 8 has built-in program software to produce drive signals of the amount corresponding to the monetary signals in accordance with the program software when the control device 8 receives the monetary signals from the bill acceptor 4 or communications device 5. When control device 8 receives from communications device 5 monetary signals sent from mobile terminal 10, and so, transmits to gaming machine 3 either of monetary signals that bill acceptor 4 produces and relays from communications device 5 to drive gaming machine 3 with the monetary signals. Control device 8 is electrically connected to a converter 5c of communications device 5 for converting denomination signal from signal processor 5b into a serial denomination signal and transmitting serial denomination signal to control device 8 of bill acceptor 4. Control device 8 has a memory area for storing a specific code identifying gaming machine 3 and also storing both monetary signals that bill acceptor 4 produces and relays from communications device 5. Otherwise, communications device 5 may forward monetary signals of transaction fee directly to gaming machine 3 skipping bill acceptor 4 so that gaming machine 3 may be driven with signals of the amount equivalent to the transaction fee amount. This allows users to select either cash or cashless electronic payment for gaming in amusement halls or casinos. In this embodiment, gaming machine 3 is driven by both monetary signals produced by bill acceptor 4 and relayed through bill acceptor 4 from communications device 5. However, gaming machine 3 may be driven with both monetary signals produced from communications device 5 and relayed through bill acceptor 4.

The present invention also contemplates that bill acceptor 4 may validate valuable coupon tickets, scrip, tender, tokens or substitutes of bills. When control device 8 considers any of these scrips genuine, it forwards the denomination signal of the scrips as monetary signals to gaming machine 3 for the activation. Each of monetary signals may indicate a money amount corresponding to one or more of denominations of bills optically or magnetically readable by bill acceptor 4. In other words, money amount to be transmitted may be selected from amounts in denominations of bills readable by bill acceptor 4. By way of example, when bill acceptor 4 can selectively validate bills of five kinds, i.e. one-dollar, five-dollar, ten-dollar, twenty-dollar or one hundred-dollar bills, it would be preferable to send signals of the amount selected from one-dollar, five-dollar, ten-dollar, twenty-dollar or one hundred-dollar bill from mobile terminal 10 to communications device 5. Thus, gaming machine 3 can be operated with drive signals while selecting cash disbursement or cashless electronic payment.

Bill acceptor 4 also comprises a stacker 9 for accommodating bills considered genuine by control device 8, and a memory device 12 electrically connected to control device 8 and attached to stacker 9 for storing monetary or denomination signals, account number signals, PIN and ID number signals and specific code signals identifying gaming machine 3 forwarded from control device 8. Control device 8 distinctively stores in the memory area both monetary signals produced by control device 8 and transmitted from communications device 5. Memory device 12 distinctively stores both monetary signals transmitted from both control device 8 and communications device 5, account number signals, PIN and ID number signals and specific code signals identifying gaming machine 3 all forwarded from control device 8.

Bill acceptor 4 is removably attached to gaming machine 3 and also stacker 9 is removably attached to bill acceptor 4 to easily take out and collect bills accumulated in stacker 9. Accordingly, when bills in stacker 9 are to be collected, bill acceptor 4 is detached from gaming machine 3 and then stacker 9 is removed from bill acceptor 4.

In operation, when mobile terminal 10 moves closer to communications device 5, it emits radio signals inclusive of the account number signals of financial database 7 identifying a holder of the account and transaction fee signals to be paid for operation of gaming machine 3. Then, communications device 5 receives radio signals to retrieve holder's account number signals in radio signals and also receive monetary signals indicative of transaction fee that may be involved in radio signals. Alternatively, communications device 5 may be connected to an entry device 25 for inputting monetary signals of a transaction fee for gaming machine 3 to transmit monetary signals from entry device 25 to communications device 5. Then, payment device 6 may receive monetary signals from entry device 25 through communications device 5 simultaneously with, before or after receiving radio signal from mobile terminal 10. Then, just like through an on-line debit or prepaid card system, payment device 6 may withdraw the transaction fee amount from the holder's account at financial database 7 when the transaction fee amount is within a deposit balance of the account. Then, payment device 6 produces an authorization signal to communications device 5 that then sends the monetary signals to gaming machine 3 to drive it.

In another embodiment of the present invention, remotely operable signals may include PIN and/or ID number signals to more strictly identify the holder in addition to the holder's account number signals of mobile terminal 10 to increase security against unauthorized access to the holder's account. When mobile terminal 10 emits radio signal inclusive of account number and PIN and/or ID number, communications device 5 may receive radio signals, retrieve account number and PIN and/or ID number signals from radio signals and withdraw the transaction fee amount from the holder's account at financial database 7 when PIN and/or ID numbers correspond to one or ones of pass-codes or secret numbers at financial database 7. In lieu of PIN and/or ID number included in radio signals, entry device 25 may be used to produce PIN and/or ID number signals from entry device 25 connected to communications device 5 to feed them to payment device 6 through communications device 5 so that payment device 6 may withdraw the transaction fee amount from the holder's account at financial database 7 when PIN and/or ID numbers correspond to one or ones of pass-codes or secret numbers at financial database 7.

In a further embodiment of the instant invention, communications device 5 may be connected to a visual and/or acoustic display device 20. When communications device 5 receives authorization signal from payment device 6, it produces and transmits a deal signal to mobile terminal 10 and/or to display device 20 to exhibit information based on the deal signal. On another aspect, when communications device 5 fails to retrieve account number in radio signal or retrieves incorrect account number, payment device 6 produces an unauthorized signal to communications device 5 that then produces and forwards a no-deal signal to mobile terminal 10 and/or to display device 20 for exhibition of information based on no-deal signal.

For example, when gaming machine 3 has completed its program-controlled operation or when a force-quit button 24 is operated to terminate the game, gaming machine 3 generates a refund money signal of an unspent remaining amount, award, prize or jackpot obtained from the game if any. Drive device 3 may transmit refund money signal and management code signal to printer 11 and also to signal processor 5b of communications device 5 to store money amount to be refunded in signal processor 5b. Signal processor 5b may also transmit refund money signal to reception means 33 of mobile terminal 10 through communications interface 5a so that mobile terminal 10 may receive and write the refund money signal in memory device 34 of mobile terminal 10 to add money amount in memory device 34. Printer 11 may record data on the refund money signal and necessary management code signals from gaming machine 3 on recording medium or media and prepares a coupon of recording media for dispensation of the coupon from printer 11. In this way, a mutual intercommunication system may be established to transport and receive electronic signals between mobile terminal 10 and signal processor 5b through wired, wireless or radio or optical connection. Specifically, communications interface 5a may receive remotely operable signals from mobile terminal 10, and transmit it to signal processor 5b that may receive remotely operable signals from communications interface 5a. Signal processor 5b may also retrieve and produce signals of account number or debit card number signals for identifying the account owner or holder and the holder's PIN and/or ID number and monetary signals or a denomination signal contained in remotely operable signals and may then send the information to payment device 6.

Figure 3:
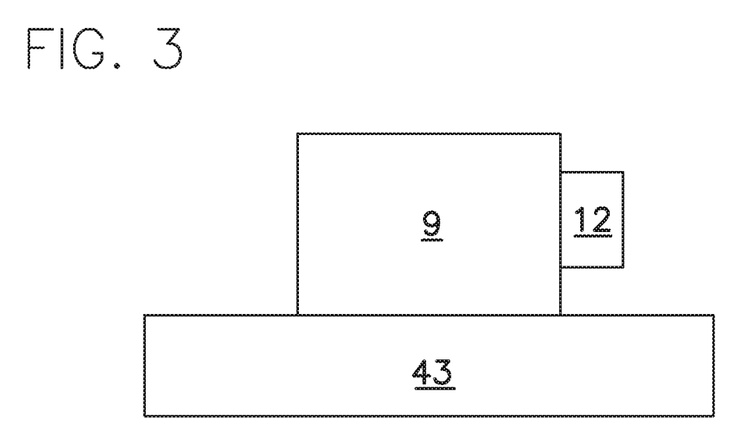
FIG. 3 is a schematic diagram showing a stacker removed from an automated machine and arranged on a reading device to retrieve information from a memory device attached to the stacker in the non-contact condition of the memory device with the reading device.

After or before bills are extracted from stacker 9, it is put on a readout device 13 as shown in FIG. 3, but storage device 12 attached to stacker 9 is retained in the non-contact condition away from readout device 43 that may be operated to retrieve the following four kinds of information stored in storage device 12:

(i) Total amount and total number of bills stowed in stacker 9;
(ii) All denomination signals of bills;
(iii) All account numbers that identify account holders involved; and
(iv) The specific code signals identifying gaming machine 3 from which stacker 9 has been removed.

The information readout device 43 has retrieved from storage device 12 is compared with the information of bills removed from stacker 9 and with the information from communications device 5 to inspect whether or not they match.

In still another embodiment, gaming machine 3 may comprise an entry device made up of a plurality of choice switches, namely entry device 25 such as image switches on a display screen or made up of mechanical selector switches to be chosen to determine a denomination of bills for payment for games so that one or more of choice switches may be selected to determine one or more of different charge amounts to be paid for gaming to transmit one or more charge or denomination signals to signal processor 5b of communications device 5. On the other hand, when mobile terminal 10 transmits to communications device 5 remotely operable signals including holder's account number signals, communications interface 5a may receive account number signals from mobile terminal 10, and signal processor 5b may receive chosen charge signal from entry device 25 and holder's account number signals transmitted from mobile terminal 10.

In operation of gaming machine 3, a user may select either cash or cashless electronic payment for games with gaming machine 3. Selecting a cashless electronic payment, he or she may operate entry device 31 of mobile terminal 10 to input money amount of gaming fees into CPU 35 that may synthesize remotely operable signals by placing on a carrier wave the money amount of gaming fees and account number signals stored in memory device 34 and then transmit remotely operable signals to communications device 5 through transmission device 32. In this way, user may move closer to gaming machine 3 and allow mobile terminal 10 to lightly touch communications interface 5a while making mobile terminal 10 produce and transmit remotely operable signals.

Figure 4:
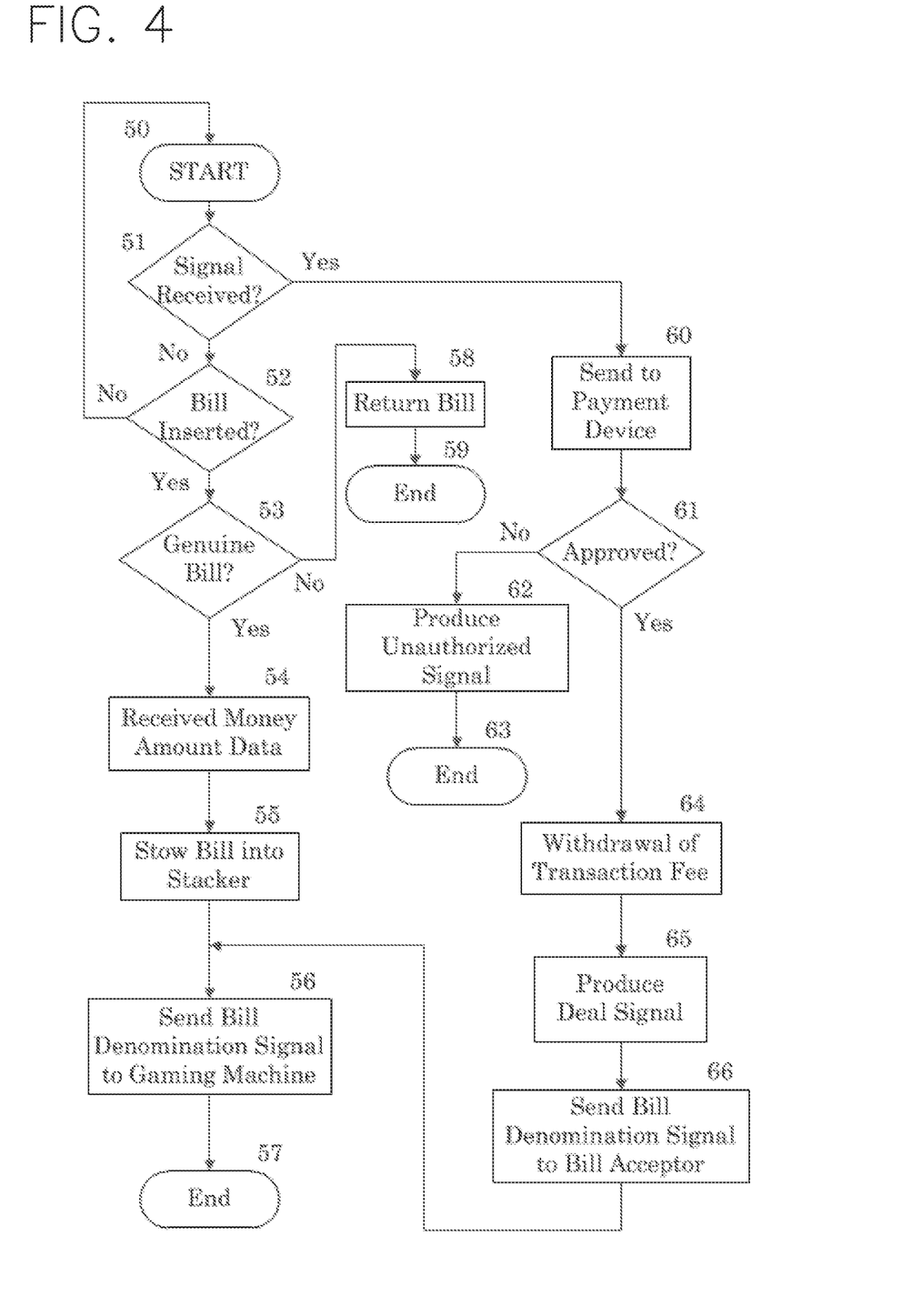
FIG. 4 is a flow chart indicating an operational sequence of the gaming machine according to the present invention.

FIG. 4 is a flow chart indicating further processing subsequent to transmission of remotely operable signals from mobile terminal 10 where processing moves on from Step 50 to 51, and so, signal processor 5b determines whether to receive remotely operable signals from mobile terminal 10. Receiving remotely operable signals through communications interface 5a in Step 51, procedure goes to Step 60 where signal processor 5b retrieves account number signals and monetary signals from remotely operable signals when remotely operable signals contain both account number and monetary signals. As mentioned before, in lieu of transmission of monetary signals from mobile terminal 10, monetary signals may be produced from entry device 25 to signal processor 5b. Then, signal processor 5b sends them to payment device 6 that receives account number and monetary signals and gains access to financial database 7 in Step 61 to determine whether the holder's account is legitimate and the transaction fee amount is within a deposit balance of the account. When payment device 6 approves holder's account as legitimate and transaction fee amount as being within a deposit balance of the account, it may withdraw the transaction fee amount from holder's account at financial database 7 (Step 64).

Subsequently, payment device 6 produces a deal signal and a denomination signal as monetary signals to signal processor 5b (Step 65) that then receives denomination signal; converter 5c converts denomination signal into a serial denomination signal to control device 8 of bill acceptor 4 that may receive serial signal in Step 66; and then, control device 8 transmits denomination signals to gaming machine 3 (Step 56). This allows to provide gaming machine 3 with drive signals of the amount corresponding to denomination signal in accordance with built-in program in gaming machine 3, and sends drive signals to gaming machine 3 to conduct a game. Then, gaming machine 3 stops its operation in Step 57.

In Step 61, when payment device 6 does not approve holder's account because of incorrect account number or transaction fee amount as being out of a deposit balance at the account, payment device 6 produces an unauthorized signal to communications device 5 that produces no-deal signal to mobile terminal 10 and display device 25 and finishes all procedure in Step 63. If remotely operable signals contain PIN and/or ID number, payment device 6 also decides whether it corresponds to one of pass-codes or secret number in financial database 7 in addition to identification of holder's account number at financial database 7. When PIN and/or ID number corresponds to pass-codes or secret numbers, payment device 6 produces an authorized signal, but, adversely, PIN and/or ID number does not correspond to pass-codes or secret numbers payment device 6 produces an unauthorized signal.

Gaming machine 3 may include all money-operated electronic gaming machines such as slot machines provided with any drive device for generating drive signals after payment by denomination signals of bills considered genuine by bill acceptor 4. Control device 8 may retain its memory area the transaction fee amount, holder's account number of financial database 7 and specific code identifying gaming machine and also transmit and write these information in storage device 12 attached to stacker 9. When payment device 6 makes unauthorized decision on payment in Step 61, it produces an unauthorized signal on payment to signal processor 5b (Step 62) to cease operations (Step 63).

On the other hand, when user selects cash payment, processing also begins with Step 50 in FIG. 4 and goes to Step 51 where without electronic signals received by signal processor 5b, and he or she inserts a bill or bills into bill acceptor 4 in Step 52, and, control device 8 receives detection signal from inlet sensor 21, while considering on whether inserted bill is genuine or not in Step 53. When control device 8 determines the bill to be inauthentic, it drives conveyor in the reverse direction to return bill to inlet of bill acceptor 4 (Step 58), and ceases the operation in Step 59. Adversely, when control device 8 considers bill to be genuine in Step 53, it determines the amount of bill (Step 54); stacker 9 stows the bill therein (Step 55); control device 8 forwards its denomination signal to gaming machine 3 (Step 56) to perform continuous operations and to stop the operation (Step 57). In this way, communications device 5 allows for cashless operation of gaming machine after verification of the monetary signals in remotely operable signals received from mobile terminal 10.

When gaming machine 3 has completed its program-controlled operation or when a player operates a force-quit button 24, gaming machine 3 immediately ceases the game, and at the same time, gaming machine 3 generates and transmits to communications device 5 and printing machine 11, management codes and a refund money signal of an unspent remaining amount or payback amount data such as award, prize or jackpot obtained from the game if any, and communications device 5 transmits the refund money signal to mobile terminal 10. Then, printer 51 of printing machine 11 prints refund money signal on a printing media and dispenses a coupon thereof. In lieu of or in addition to dispensing a coupon, gaming machine 3 may send refund or payback amount data to communications device 5 that may convert the received refund money signal into a predetermined format and send them to mobile terminal 10. In this way, this system is very convenient for users who can receive goods, services or amusement from automated machine 11 with real-time electronic payment for transaction while a owner of automated machine 11 can surely receive a spot payment without credit transaction.

Figure 5:
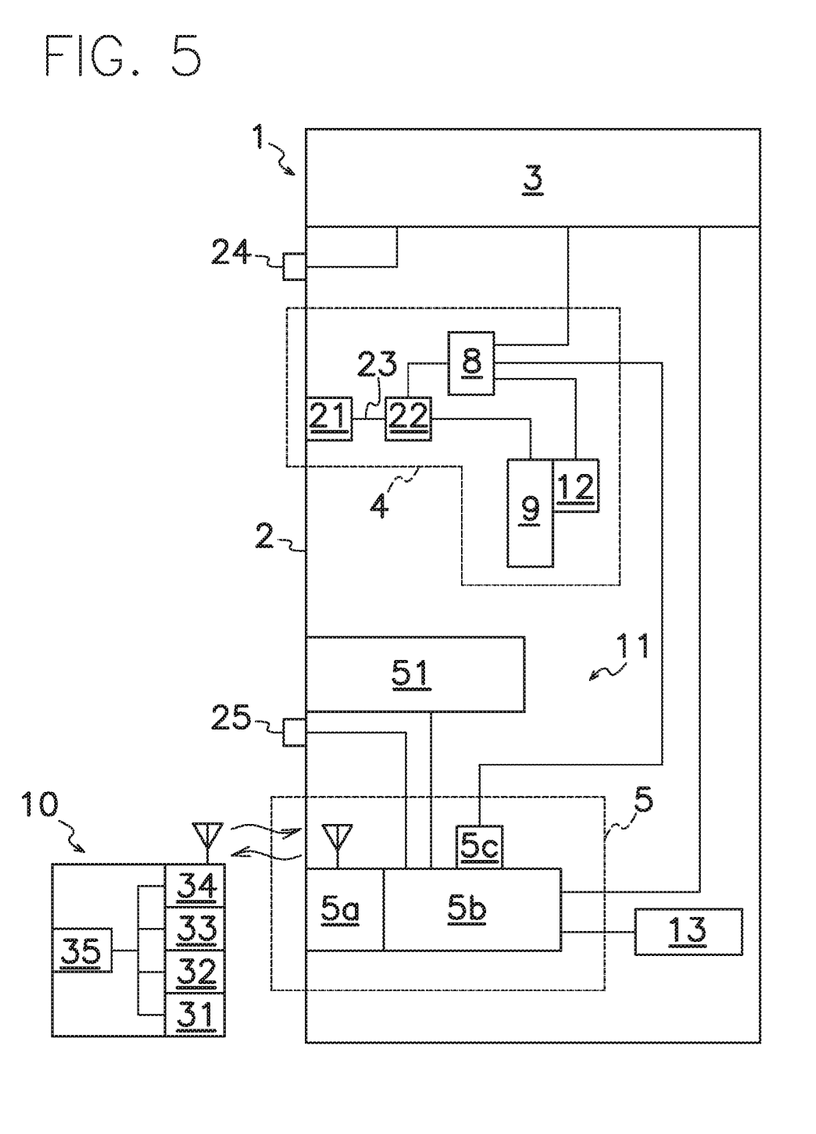
FIG. 5 is a schematic diagram showing a second embodiment of the invention's automated machine of the prepaid payment type applied to a gaming machine.

Unlike the first embodiment shown in FIG. 1 utilizing automatic payment device 6 and financial database 7, FIG. 5 is a block diagram schematically showing another embodiment of a prepaid payment type gaming machine 3 according to the invention. In FIG. 5, same reference symbols are applied to same or similar elements shown in FIG. 2, omitting their description. Mobile terminal 10 of FIG. 5 comprises a memory device 34 such as a memory card or flash memory in cellular phone for storing code information that includes an account number of a holder's debit or prepaid card, PIN (Personal Identification Number) and/or ID (Identification) number, an entry device 31 such as a numerical keypad or keyboard in cellular phone for inputting an transaction fee amount signals such as gaming fees into memory device 34, a CPU 35 electrically connected to all means for preparing remotely operable signals inclusive of the code information stored from memory device 34, a transmission device 32 for transmitting remotely operable signals from CPU 35 to communications device 5, reception means 33 for receiving a deal signal from communications device 5 when communications device 5 transmits to mobile terminal 10 the deal signal produced by communications device 5, and a battery (not shown) for supplying electric power to each means to perform reading, writing, transmitting and receiving functions in mobile terminal 10.

Memory device 34 does not need to store the code information for enhancement in security if any code signals may be produced by entry device 31 and transmitted outside through transmission device 32. A single convertible transceiver means may be used for transmission and reception means 32, 33. CPU 35 may prepare remotely operable signals that contain transaction fee signals and a code signal inclusive of account number of debit or prepaid card, PIN (Personal Identification Number) and/or ID (Identification) number.

In this embodiment, memory device 34 of mobile terminal 10 stores an electronic amount signal of prepaid money and at least one of specific PIN and ID number signals for identifying a holder of mobile terminal 10. Transmission device 32 emits remotely operable signals including the at least one of the specific signals. A storage unit 13 in printing machine 11 stores at least one of users' specific PIN and ID signals. Communications device 5 in printing machine 11 is connected to automated machine 1 and receives remotely operable signals emitted from mobile terminal 10 to retrieve at least one of the specific signals in remotely operable signals. Communications device 5 also receives monetary signals indicative of a transaction fee necessary to drive automated machine 1 simultaneously with, before or after receiving remotely operable signals. Monetary signal may be contained in remotely operable signals so that it may be emitted from mobile terminal 10 and received by communications device 5.

Otherwise, monetary signals may be produced by entry device 25 to communications device 5. When communications device 5 decides that monetary signals and at least specific signal are valid as a result of comparing the at least specific signal with that stored in storage unit 13, communications device 5 produces monetary signals to drive automated machine 1 and also produces a deduction signal of transaction fee to mobile terminal 10. Subsequently, mobile terminal 10 receives deduction signal from communication device 5 to deduct transaction fee from prepaid money amount in memory device 34. A forced shut-down button 24 and entry device 25 may be made in a touch screen display on display device 20 of automated machine 1.

Figure 6:
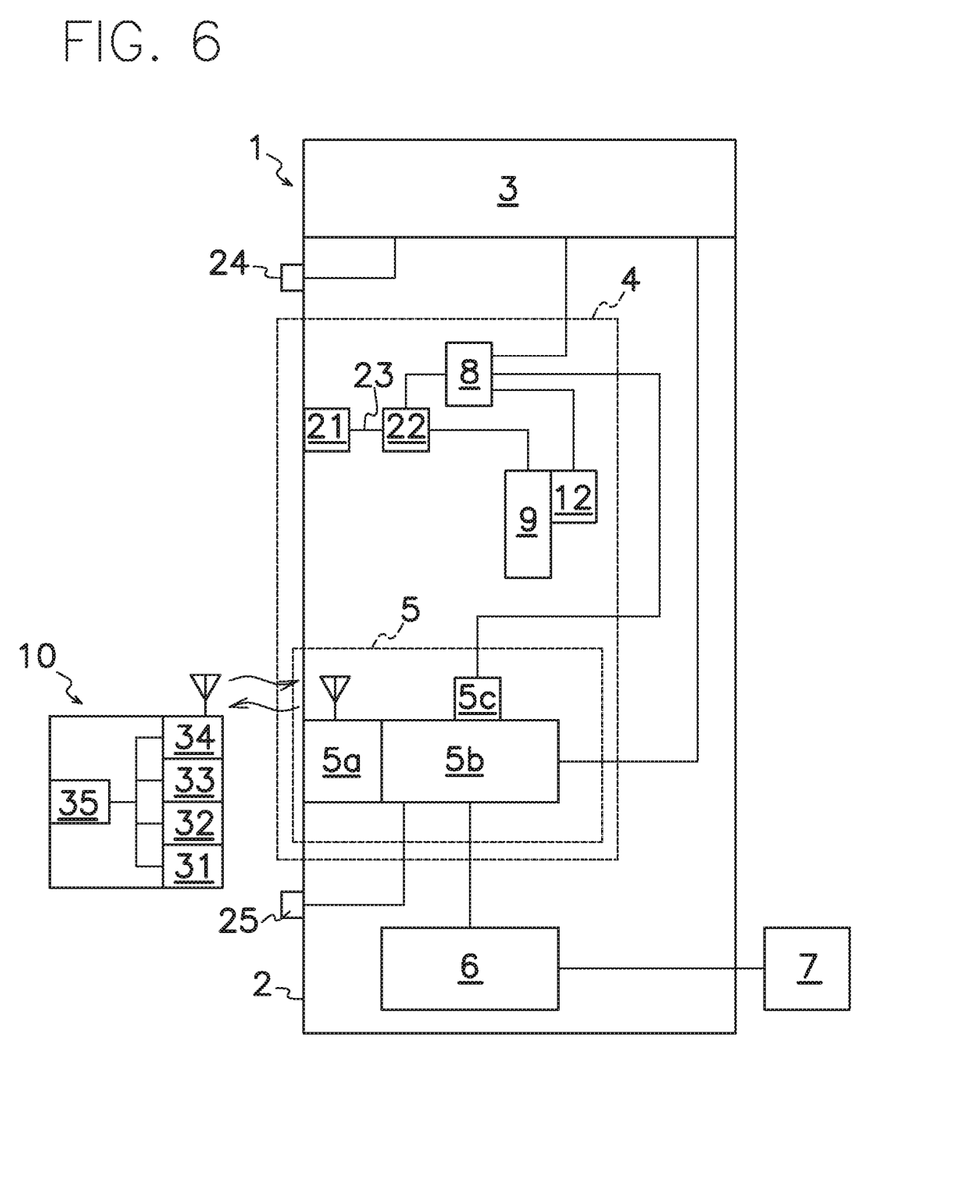
FIG. 6 is a schematic diagram showing the gaming machine of FIG. 2 provided with a modified bill acceptor that has a built-in communications device.
Figure 7:
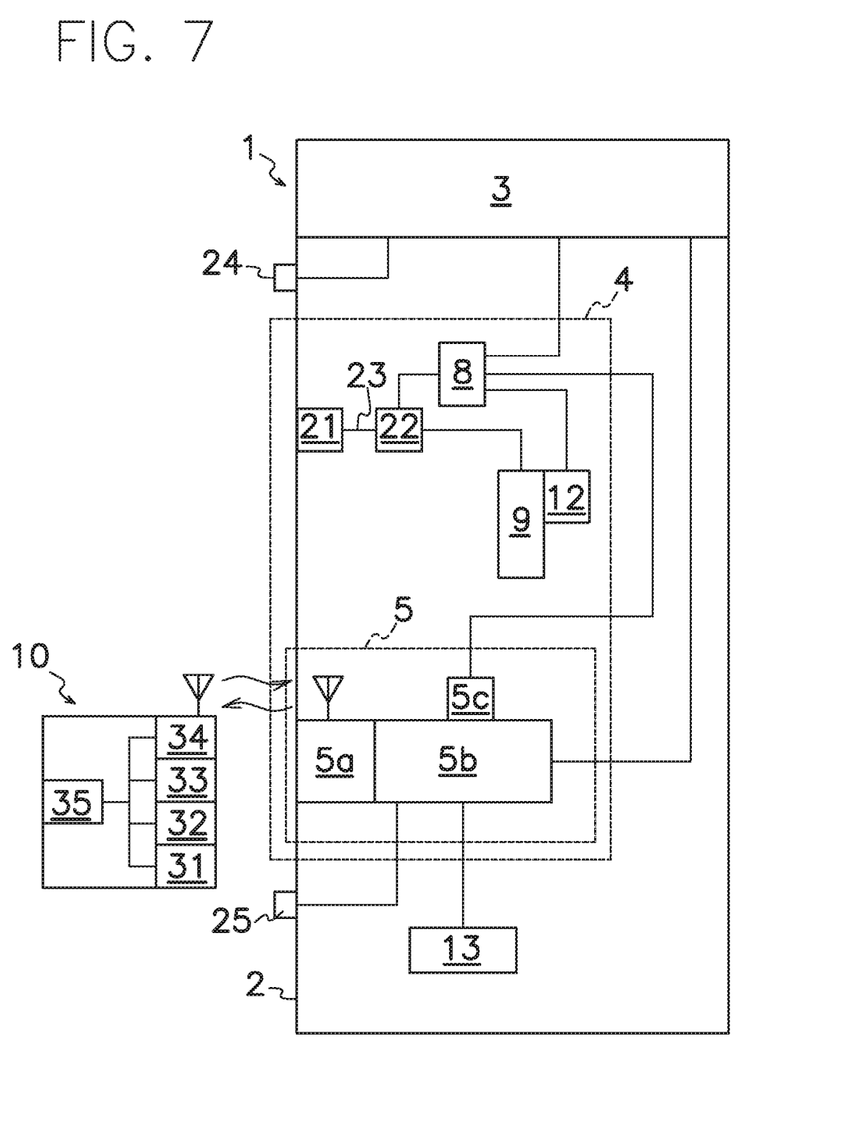
FIG. 7 is a schematic diagram showing the gaming machine of FIG. 5 provided with the bill acceptor that has a built-in communications device connected to a memory device.
Figure 8:
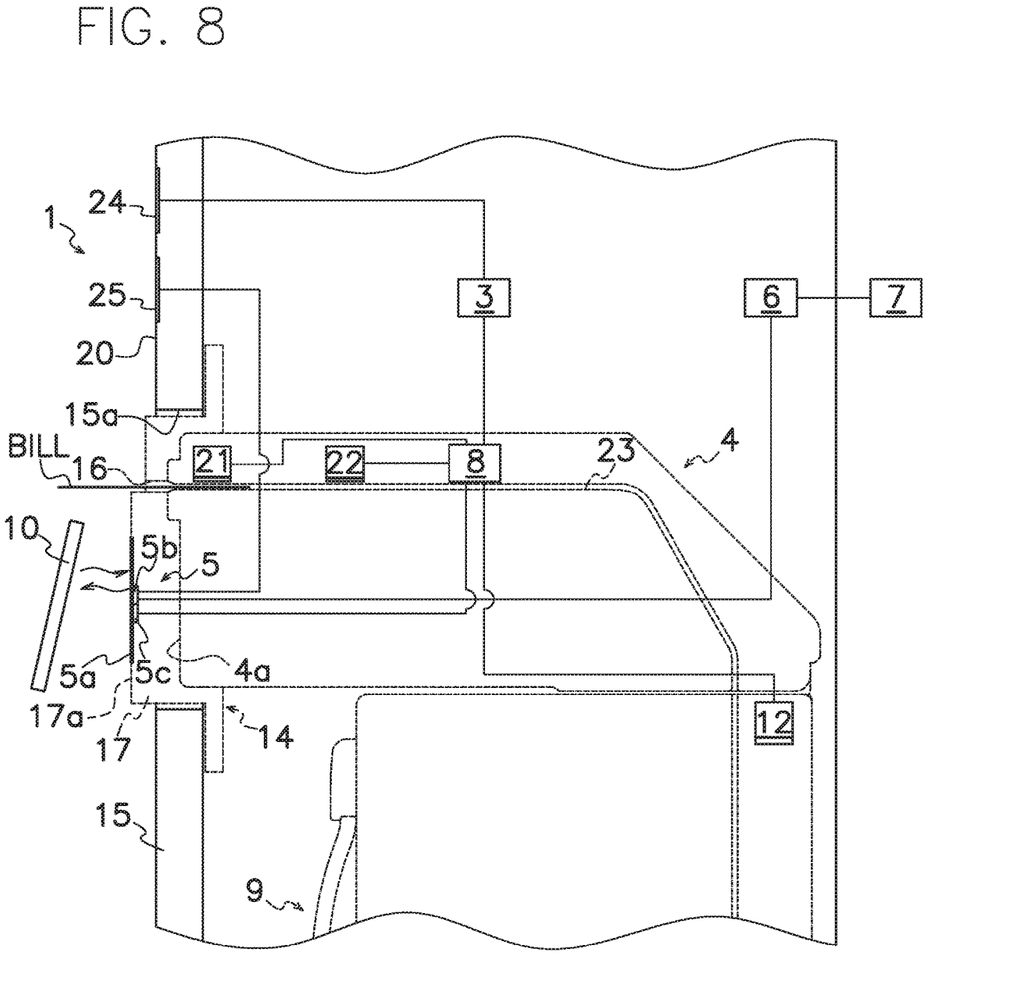
FIG. 8 is a sectional view of the gaming machine of FIG. 2 provided with a bill acceptor of a bezel that has a built-in communications device.
Figure 9:
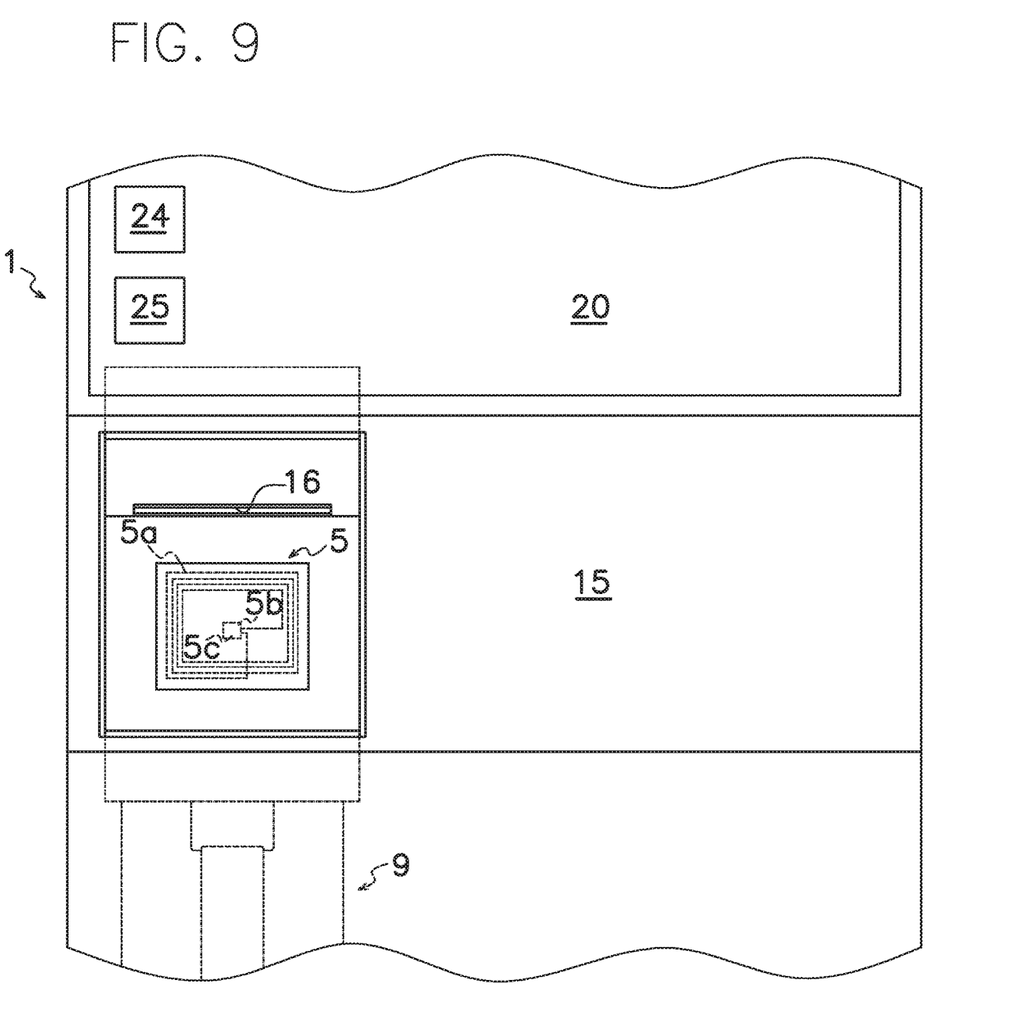
FIG. 9 is a front view of the bill acceptor attached to the gaming machine of FIG. 8.

FIGS. 6 and 7 show two kinds of automated machines 1 that have bill acceptors 4 both provided with communications device 5 of respectively the bank account withdrawal payment type and prepaid payment types so that communications device 5-integrated bill acceptor 4 is very advantageous in making automated machine 1 in its smaller and simpler size while adding the communication function to bill acceptor 4. The embodiment in FIGS. 8 and 9, shows bill acceptor 4 that has a bezel (front mask) 14 attached to front surface of bill acceptor 4 4a to allow a user to insert a bill or bills into an inlet 16 of bezel 14 of bill acceptor 4 to operate automated machine 1.

Bezel 14 comprises a face plate 17 that is attached to front surface 4a of bill acceptor 4 to be received through an opening 15a formed in door panel 15 of automated machine 1 and slightly project forward from door panel 15. Communications device 5 that is embedded or buried within face plate 17, has a communications interface 5a formed with a loop coiled radio antenna embedded in front wall 17a of face plate 17. The antenna shown in FIGS. 8 and 9 may be integrally formed and encapsulated in plastic front wall 17a of face plate 17 to prevent damage of the antenna by contact with outer objects.

In operation of gaming machine 3, the user may set or approach mobile terminal 10 toward face plate 17 of bezel 14 to emit remotely operable signals from mobile terminal 10 to the antenna of communications device 5. Although mobile terminal 10 emits the remotely operable signals of short wavelength radiation toward communications device 5 away from mobile terminal 10, the signals may surely be received by the antenna of communications interface 5a in front wall 17a of face plate 17.

What is claimed is:

1. An automated machine comprising:
a communications device for receiving remotely operable signals emitted from a mobile terminal to produce monetary signals corresponding to money amount data in the remotely operable signals;
a bill acceptor for validating bills inserted from the outside to produce the monetary signals when the bill acceptor judges the inserted bill to be genuine and for receiving the monetary signals from the communications device;
a control device that has built-in program software to produce drive signals of the amount corresponding to the monetary signals in accordance with the program software when the control device receives the monetary signals from the bill acceptor; and
a drive device driven by the drive signals from the control device.

2. An automated machine comprising:
a bill acceptor for validating bills inserted from the outside to produce monetary signals when the bill acceptor judges the inserted bill to be genuine;
a communications device for receiving the remotely operable signals emitted from a mobile terminal to produce monetary signals corresponding to money amount data in the remotely operable signals and for receiving the monetary signals from the bill acceptor;
a control device that has built-in program software to produce drive signals of the amount corresponding to the monetary signals in accordance with the program software when the control device receives the monetary signals from the communications device; and
a drive device driven by the drive signals from the control device.

3. The automated machine of claim 1, wherein the communications device receives monetary signals indicative of a transaction fee necessary to drive the automated machine simultaneously with, before or after receiving the remotely operable signals, the monetary signals being either contained in the received remotely operable signals of the mobile terminal or transmitted from an entry device provided in the automated machine.

4. The automated machine of claim 2, wherein the communications device receives monetary signals indicative of a transaction fee necessary to drive the automated machine simultaneously with, before or after receiving the remotely operable signals, the monetary signals being either contained in the received remotely operable signals of the mobile terminal or transmitted from an entry device provided in the automated machine.

* * * * *